United States Patent [19]

Kreitzer et al.

[11] 4,367,928
[45] Jan. 11, 1983

[54] WIDE ANGLE LENS ATTACHMENT

[75] Inventors: Melvyn H. Kreitzer, Cincinnati, Ohio; Muh-fa Chen, Daytona Beach, Fla.

[73] Assignee: Vivitar Corporation, Santa Monica, Calif.

[21] Appl. No.: 139,346

[22] Filed: Apr. 11, 1980

[51] Int. Cl.³ .............................................. G02B 13/22
[52] U.S. Cl. .................................................... 350/453
[58] Field of Search .......................................... 350/453

[56] References Cited
U.S. PATENT DOCUMENTS 3,152,211 10/1964 Cox et al. ............................ 350/453
4,269,474 5/1981 Kamimura ........................... 350/453

FOREIGN PATENT DOCUMENTS 978389 12/1964 United Kingdom ................ 350/453

*Primary Examiner*—Vincent P. McGraw
*Attorney, Agent, or Firm*—Costas, Montgomery & Dorman

[57] ABSTRACT

A wide angle attachment adapted to be used with a prime lens. The lens comprises four elements in three groups. The combination of the attachment with a prime lens results in a lens system having a larger field of view than the field of view of the prime lens by itself.

9 Claims, 3 Drawing Figures

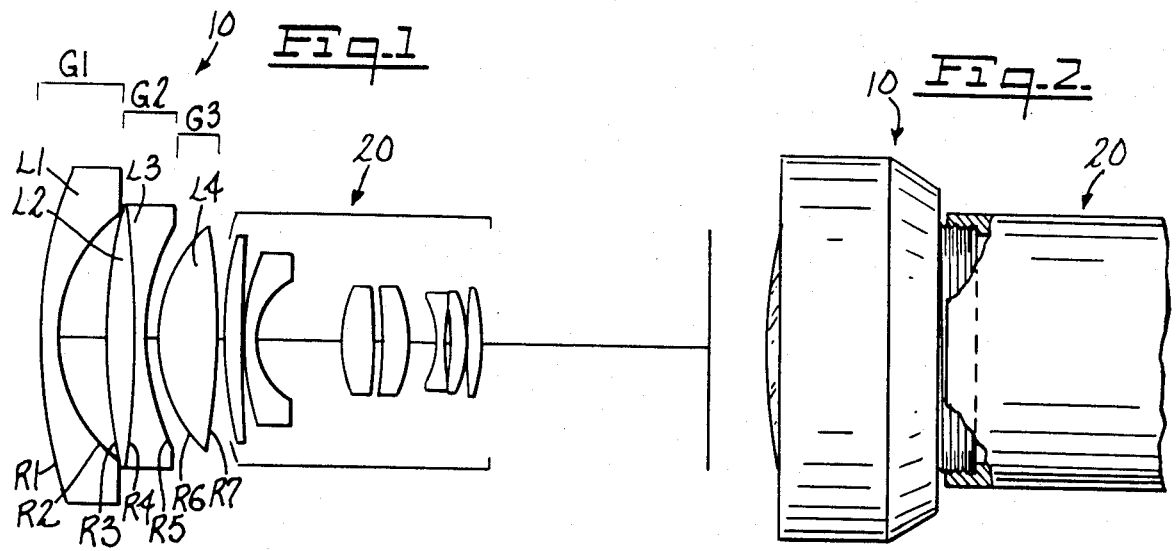
Fig. 1
Fig. 2
Fig. 3
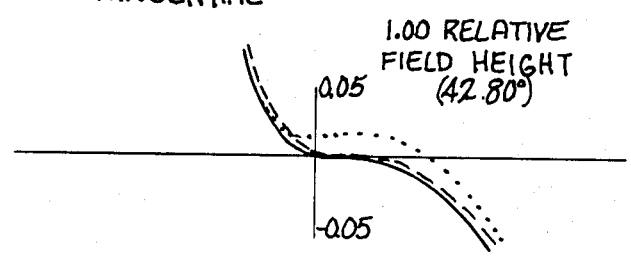 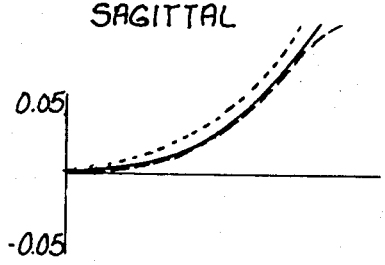
1.00 RELATIVE FIELD HEIGHT (42.80°)
0.70 RELATIVE FIELD HEIGHT (32.95°)
0.50 RELATIVE FIELD HEIGTH (24.84°)
0.00 RELATIVE FIELD HEIGTH (0.00)

WIDE ANGLE LENS ATTACHMENT

This invention relates generally to the field of photographic lenses and, more particularly, to wide angle lenses.

The present invention provides a wide angle attachment for use as a front accessory on a prime lens. The combination of the present invention with the prime lens results in a lens system covering a larger field of view than the field of view of the prime lens by itself.

The wide angle attachment is suitable for use with a wide variety of prime lenses. In particular, the wide angle attachment may be used in conjunction with prime lenses which are the subject of U.S. Application Ser. No. 118,519, filed Feb. 4, 1980, and U.S. Application Ser. No. 97,543, filed Nov. 26, 1979. These latter wide angle prime lenses have equivalent focal lengths of 28 mm as scaled to a 24×36 mm camera image format. The wide angle attachment may also be used in conjunction with many 35 mm prime lenses scaled to a 24×36 mm image format.

This invention provides for a reversed telescopic wide angle attachment having a telescopic power greater than 0.65. The telescopic power of a lens may be defined as the ratio of the image field angle to the object field angle. The term "reversed telescopic lens" indicates a lens with a telescopic power less than one.

When used in conjunction with a prime lens of 28 mm equivalent focal length having a field angle of 75°, such as the lens disclosed in U.S. Application Ser. No. 118,519, filed Feb. 4, 1980, an embodiment of which is substantially defined in Table V, the wide angle attachment provides a system with a total field angle of 90°, and an equivalent focal length of 21 mm. The system provided by the wide angle attachment in conjunction with a prime lens of 35 mm equivalent focal length having a field angle of 63°, such as the lens disclosed in U.S. Pat. No. 4,182,549, an embodiment of which is substantially defined in Table VI, yields a system with a field angle of 76°.

An important consideration in the design of a wide angle attachment is the provision for favorable correction of distortion and lateral color within a compact lens format. Compactness of the wide angle attachment is essential because of the employment of the wide angle attachment as a front accessory to the prime lens system.

The lens attachment is afocal. The attachment is connected to the object end of the prime lens of a conventional camera by means of either screwing the attachment into the filter threads of the prime lens or by other suitable coupling mechanisms. Such connecting means also act to ensure axial alignment of the wide angle attachment and the prime lens. Focusing of the lens system which results from the combination of the wide angle attachment and the prime lens is accomplished by the focusing means of the prime lens.

Briefly stated, the invention comprises from the object end a first lens group and a second group, both of which are divergent, and a third lens group which is a convergent lens group. The lens groups and elements thereof have relative power and configurations to achieve the objects of the invention as hereinafter pointed out.

An object of this invention is to provide a new and improved wide angle attachment which is relatively compact and is easily adaptable for use with a prime lens to increase the field angle of the overall combination.

Another object of this invention is to provide a new and improved wide angle lens system which is well corrected for distortion and chromatic aberration.

The features of the invention which are believed to be novel are particularly pointed out and distinctly claimed in the concluding portion of the specification. The invention, however, both as to its organization and operation, together with further objects and advantages thereof may best be appreciated by reference to the following detailed description taken in conjunction with the drawings, wherein:

FIG. 1 is a side elevation of a lens form embodying the invention, in conjunction with a prime lens;

FIG. 2 is a side elevation of a lens form embodying the invention and a prime lens, illustrating the connecting means between the wide angle attachment and the prime lens; and FIG. 3 is a series of graphical representations of various aberrations of the lens system of FIG. 1.

A lens 10 embodying the invention comprises three groups G1, G2 and G3 from the object end to the image end and described generally as follows:

Group G1 comprises a meniscus L1 of negative power having a convex object side surface, Group G2 comprises a doublet of negative power comprising a positive bi-convex element L2 and negative bi-concave element L3.

Group G3 comprises a bi-convex element L4 of positive power.

Since all of the embodiments disclosed herein have a similar basic configuration, they will all be described generally with reference to FIG. 1.

The meniscus front element L1 reduces the chief ray angle for the following elements in the system.

The negative doublet of group G2 provides for good correction of lateral color. The overall meniscus shape of the doublet further acts to reduce aberrational contributions. The concave to the object interface of element L3 corrects a substantial amount of the lateral color aberration introduced at the first lens L1.

If group G2 were in the form of a negative singlet, the negative singlet would provide for a greater degree of compactness and would reduce the manufacturing cost of the attachment. However, such a three element wide angle attachment would not provide the desired degree of lateral color correction.

The thick bi-convex lens L4 contributes strong positive power which aids in the production of the afocal condition of the attachment.

Generally, the rear element of the wide angle attachment should be as close as possible to the front object end element of the prime lens to avoid vignetting. Typical separation distances between the rear element of the wide angle attachment and the front element of the prime lens are on the order of 1 mm to 2 mm. Vignetting may occur if design considerations of the attachment are not consistent with the position of the entrance pupil of the prime lens.

The attachment is designed so that it may be used with a number of prime retrofocus lenses. However, the wide angle lens attachment necessarily assumes a certain entrance pupil position in the prime lens. Because the pupil position will be more nearly constant for other retrofocus lenses than for non-retrofocus lenses, the wide angle attachments as disclosed are more suitable for use in conjunction with retrofocus lenses.

The wide angle attachment as disclosed is particularly adapted for use with 28 mm lenses scaled for a 24×36 mm image frame, but 35 mm lenses and other lenses may also utilize the wide angle attachment. The attachment is specifically designed for use in conjunction with prime lenses disclosed in U.S. Application Ser. No. 118,519, filed Feb. 4, 1980, now U.S. Pat. No. 4,333,714, and U.S. Application Ser. No. 97,543, filed Nov. 26, 1979.

In the following tables, examples are set forth of lenses embodying the invention. The first column lists lens elements from the object side to the image side. The second column gives the surface of the lens elements numerically starting at the object end of the system. The third column lists the radii for the respective surfaces of the elements with the positive radii struck from the right and the negative radii struck from the left. The fourth column shows the axial spacing between surfaces. The fifth and sixth columns show, respectively, the refractive index $N_d$ and the dispersive index $V_d$ of the elements L1-L4.

Table I describes a lens 10 scaled to a 24×36 mm image frame, suitable for use in combination with a prime lens having an equivalent focal length of 28 mm such as the prime lens disclosed in U.S. Application Ser. No. 118,519, filed Feb. 4, 1980, now U.S. Pat. No. 4,333,714.

TABLE I

| Element | Surface Radii (mm) | | Axial Distance Between Surfaces (mm) | $N_d$ | $V_d$ |
|---|---|---|---|---|---|
| L1 | R1 = | 78.609 | | | |
|  | | | 3.00 | 1.8061 | 40.74 |
|  | R2 = | 23.594 | | | |
|  | | | 7.43 | | |
| L2 | R3 = | 74.332 | | | |
|  | | | 4.60 | 1.8052 | 25.46 |
|  | R4 = | −175.707 | | | |
| L3 | | | 2.00 | 1.7200 | 50.34 |
|  | R5 = | 37.399 | | | |
|  | | | 1.74 | | |
|  | R6 = | 24.504 | | | |
| L4 | | | 9.34 | 1.5168 | 64.20 |
|  | R7 = | −100.060 | | | |

The separation distance between the last lens surface R7 and the first lens surface of the prime lens is on the order of 1.0 mm.

Table II describes a lens 10 scaled to a 24×36 mm image frame, suitable for use in combination with a prime lens with an equivalent focal length of 28 mm such as the prime lens disclosed in U.S. Patent Application Ser. No. 97,543, filed Nov. 26, 1979.

TABLE II

| Element | Surface Radii (mm) | | Axial Distance Between Surfaces (mm) | $N_d$ | $V_d$ |
|---|---|---|---|---|---|
| L1 | R1 = | 99.988 | | | |
|  | | | 3.00 | 1.8340 | 37.34 |
|  | R2 = | 25.385 | | | |
|  | | | 8.24 | | |
| L2 | R3 = | 114.235 | | | |
|  | | | 5.22 | 1.8052 | 25.46 |
|  | R4 = | −100.634 | | | |
| L3 | | | 2.50 | 1.7200 | 50.34 |
|  | R5 = | 41.799 | | | |
|  | | | 0.25 | | |
|  | R6 = | 28.675 | | | |
| L4 | | | 9.55 | 1.6385 | 55.46 |
|  | R7 = | −105.179 | | | |

The separation distance between the last lens surface R7 and the first lens surface of the prime lens is on the order of 1.0 mm.

Table III describes a lens 10 scaled to a 24×36 mm image frame and suitable for use in combination with a prime lens having an equivalent focal length of 28 mm such as the prime lens disclosed in U.S. Patent Application Ser. No. 118,519, filed Feb. 4, 1980, now U.S. Pat. No. 4,333,714.

TABLE III

| Element | Surface Radii (mm) | | Axial Distance Between Surfaces (mm) | $N_d$ | $V_d$ |
|---|---|---|---|---|---|
| L1 | R1 = | 71.870 | | | |
|  | | | 2.00 | 1.8340 | 37.34 |
|  | R2 = | 23.246 | | | |
|  | | | 8.54 | | |
| L2 | R3 = | 89.858 | | | |
|  | | | 5.30 | 1.8052 | 25.46 |
|  | R4 = | −97.762 | | | |
| L3 | | | 2.00 | 1.7725 | 49.62 |
|  | R5 = | 40.177 | | | |
|  | | | 0.50 | | |
|  | R6 = | 25.840 | | | |
| L4 | | | 9.03 | 1.6073 | 59.47 |
|  | R7 = | −115.012 | | | |

The separation distance between the last lens surface R7 and the first lens surface of the prime lens is on the order of 2.0 mm.

Table IV describes a lens 10 scaled to a 24×36 mm image frame suitable for use in combination with a prime lens having an equivalent focal length of 28 mm such as the prime lens disclosed in U.S. Patent Application Ser. No. 118,519, filed Feb. 4, 1980, now U.S. Pat. No. 4,333,714.

TABLE IV

| Element | Surface Radii (mm) | | Axial Distance Between Surfaces (mm) | $N_d$ | $V_d$ |
|---|---|---|---|---|---|
| L1 | R1 = | 80.029 | | | |
|  | | | 2.00 | 1.834 | 37.3 |
|  | R2 = | 23.995 | | | |
|  | | | 8.27 | | |
| L2 | R3 = | 84.587 | | | |
|  | | | 5.55 | 1.805 | 25.5 |
|  | R4 = | −91.122 | | | |
| L3 | | | 2.00 | 1.743 | 49.2 |
|  | R5 = | 37.845 | | | |
|  | | | 0.50 | | |
|  | R6 = | 25.895 | | | |
| L4 | | | 9.35 | 1.589 | 61.3 |
|  | R7 = | −103.236 | | | |

The separation distance between the last lens surface R7 and the first lens surface of the prime lens is on the order of 2.0 mm.

All of the foregoing examples are afocal and have a telescopic power less than unity and greater than 0.65.

Table V describes a prime lens 20 scaled to an equivalent focal length of 28 mm for a 24×36 mm image frame. The lens covers a field angle of 75° by itself.

TABLE V

| Element | Surface Radii (mm) | | Axial Distance Between Surfaces (mm) | $N_d$ | $V_d$ |
|---|---|---|---|---|---|
| L1 | R1 = | 61.850 | | | |
|  | | | 3.08 | 1.564 | 60.8 |
|  | R2 = | 525.96 | | | |
|  | | | 0.20 | | |
|  | R3 = | 43.704 | | | |

TABLE V-continued

| Element | Surface Radii (mm) | | Axial Distance Between Surfaces (mm) | $N_d$ | $V_d$ |
|---|---|---|---|---|---|
| L2 | | | 2.00 | 1.658 | 57.3 |
| | R4 = | 10.686 | | | |
| | | | 13.51 | | |
| | R5 = | 27.960 | | | |
| L3 | | | 5.00 | 1.723 | 38.0 |
| | R6 = | −88.640 | | | |
| | | | 1.38 | | |
| | R7 = | −51.100 | | | |
| L4 | | | 4.00 | 1.613 | 58.6 |
| | R8 = | −19.674 | | | |
| | | | 4.22 | | |
| | R9 = | −15.412 | | | |
| L5 | | | 1.50 | 1.785 | 26.1 |
| | R10 = | 56.410 | | | |
| | | | 0.85 | | |
| | R11 = | −71.028 | | | |
| L6 | | | 2.60 | 1.720 | 50.3 |
| | R12 = | −17.375 | | | |
| | | | 0.20 | | |
| | R13 = | −239.300 | | | |
| L7 | | | 2.46 | 1.697 | 55.5 |
| | R14 = | −26.573 | | | |

The combined lenses of Tables I and V provide a system having a field angle of 90°.

Table VI describes a six element prime lens scaled to an equivalent focal length of 35 mm for a 24×36 mm image frame. The lens covers a field angle of 63° by itself.

TABLE VI

| Element | Surface Radii (mm) | | Axial Distance Between Surfaces (mm) | $N_d$ | $V_d$ |
|---|---|---|---|---|---|
| L1 | R1 = | 171.000 | | | |
| | | | 2.50 | 1.607 | 56.7 |
| | R2 = | 13.603 | | | |
| | | | 7.22 | | |
| L2 | R3 = | 26.710 | | | |
| | | | 4.00 | 1.720 | 50.3 |
| | R4 = | −246.680 | | | |
| | | | 5.32 | | |
| L3 | R5 = | 44.448 | | | |
| | | | 5.50 | 1.617 | 53.9 |
| | R6 = | −26.718 | | | |
| | | | 4.78 | | |
| L4 | R7 = | −17.288 | | | |
| | | | 1.50 | 1.785 | 26.1 |
| | R8 = | 51.100 | | | |
| | | | 1.31 | | |
| L5 | R9 = | −35.100 | | | |
| | | | 2.46 | 1.720 | 50.3 |
| | R10 = | −16.708 | | | |
| | | | 0.2 | | |
| L6 | R11 = | −81.42 | | | |
| | | | 2.20 | 1.762 | 40.3 |
| | R12 = | −27.96 | | | |

The combined lenses of Tables I and VI provide a system having a field angle of 76°.

FIG. 3 graphically represents various transverse ray aberrations of the optical system shown in FIG. 1 and having a wide angle attachment as set forth in Table I and the prime lens described in Table V above. The dash line curve represents the axial ray bundle for a 480.0 nm wavelength; the solid line is for 546.1 nm wavelength; and the dotted line is for 643.8 nm wavelength.

Table VII sets forth the powers of the second and third groups of the embodiments of Tables I through IV. $K_2$ represents the power (as the reciprocal of focal length) of the second group comprising a doublet. $K_3$ represents the power (as the reciprocal of focal length) of the singlet of the third group.

TABLE VII

| Table | $K_2$ | $K_3$ | $|K_3/K_2|$ |
|---|---|---|---|
| I | −.00717 | +.02559 | 3.570 |
| II | −.00880 | +.02757 | 3.133 |
| III | −.00926 | +.02807 | 3.031 |
| IV | −.00865 | +.02769 | 3.201 |

The powers of groups G2 and G3 have the following relationship:

$$3.0 < |K_3/K_2| < 4.0$$

The configuration of the attachment provides a compact lens which increases the field angle of a prime lens without introduction of unacceptable distortion and lateral color aberration.

While preferred embodiments of the invention have been set forth for purposes of disclosure, other embodiments and modifications of the disclosed embodiment of the invention may be derived by others skilled in the art. Accordingly, the appended claims are intended to cover all embodiments and applications of the invention, and reversals thereof which do not depart from the spirit and scope of the invention.

What is claimed is:

1. An afocal reversed telescopic lens adapted to be used with a retrofocus prime lens to provide an increased field angle of the combined lenses upon axial alignment with the prime lens at the object end thereof, said lens comprising from the object end: a first negative group consisting of a meniscus element convex to the object, a second group in the form of a negative doublet including a positive element convex to the object, and a third positive group having convex object and image side surfaces.

2. A lens as defined in claim 1 wherein the telescopic power of said lens is at least 0.65 and less than 1.0.

3. A lens as defined in claim 1 wherein $$3.0 < |K_3/K_2| < 4.0$$

where $K_3$ is the power of the third group and $K_2$ is the power of the second group.

4. A lens as defined in claim 1 defined substantially by the following data as scaled for use in combination with a prime lens of the 24×36 mm image format:

| Element | Surface Radii (mm) | | Axial Distance Between Surfaces (mm) | $N_d$ | $V_d$ |
|---|---|---|---|---|---|
| L1 | R1 = | 78.609 | | | |
| | | | 3.00 | 1.8061 | 40.74 |
| | R2 = | 23.594 | | | |
| | | | 7.43 | | |
| L2 | R3 = | 74.332 | | | |
| | | | 4.60 | 1.8052 | 25.46 |
| | R4 = | −175.707 | | | |
| L3 | | | 2.00 | 1.7200 | 50.34 |
| | R5 = | 37.399 | | | |
| | | | 1.74 | | |
| | R6 = | 24.504 | | | |
| L4 | | | 9.34 | 1.5168 | 64.20 |
| | R7 = | −100.060 | | | | where L1–L4 represent the lens elements from the object end to the image side; R1–R7 are the radii of the lens surfaces in millimeters; $N_d$ is the index of refraction of each lens element; and $V_d$ is the dispersion of each lens element in terms of its Abbe number.

5. A lens as defined in claim 1 defined substantially by the following data as scaled for use in combination with a prime lens of the 24×36 mm image format:

| Element | Surface Radii (mm) | | Axial Distance Between Surfaces (mm) | $N_d$ | $V_d$ |
|---|---|---|---|---|---|
| L1 | R1 = | 99.988 | | | |
| | | | 3.00 | 1.8340 | 37.34 |
| | R2 = | 25.385 | | | |
| | | | 8.24 | | |
| L2 | R3 = | 114.235 | | | |
| | | | 5.22 | 1.8052 | 25.46 |
| | R4 = | −100.634 | | | |
| L3 | | | 2.50 | 1.7200 | 50.34 |
| | R5 = | 41.799 | | | |
| | | | 0.25 | | |
| | R6 = | 28.675 | | | |
| L4 | | | 9.55 | 1.6385 | 55.46 |
| | R7 = | −105.179 | | | | where L1-L4 represent the lens elements from the object end to the image side; R1-R7 are the radii of the lens surfaces in millimeters; $N_d$ is the index of refraction of each lens element; and $V_d$ is the dispersion of each lens element in terms of its Abbe number.

6. A lens as defined in claim 1 defined substantially by the following data as scaled for use in combination with a prime lens of the 24×36 mm image format:

| Element | Surface Radii (mm) | | Axial Distance Between Surfaces (mm) | $N_d$ | $V_d$ |
|---|---|---|---|---|---|
| L1 | R1 = | 71.870 | | | |
| | | | 2.00 | 1.8340 | 37.34 |
| | R2 = | 23.246 | | | |
| | | | 8.54 | | |
| L2 | R3 = | 89.858 | | | |
| | | | 5.30 | 1.8052 | 25.46 |
| | R4 = | −97.762 | | | |
| L3 | | | 2.00 | 1.7725 | 49.62 |
| | R5 = | 40.177 | | | |
| | | | 0.50 | | |
| | R6 = | 25.840 | | | |
| L4 | | | 9.03 | 1.6073 | 59.47 |
| | R7 = | −115.012 | | | | where L1-L4 represent the lens elements from the object end to the image side; R1-R7 are the radii of the lens surfaces in millimeters; $N_d$ is the index of refraction of each lens element; and $V_d$ is the dispersion of each lens element in terms of its Abbe number.

7. A lens as defined in claim 1 defined substantially by the following data as scaled for use in combination with a prime lens of the 24×36 mm image format:

| Element | Surface Radii (mm) | | Axial Distance Between Surfaces (mm) | $N_d$ | $V_d$ |
|---|---|---|---|---|---|
| L1 | R1 = | 80.029 | | | |
| | | | 2.00 | 1.834 | 37.3 |
| | R2 = | 23.995 | | | |
| | | | 8.27 | | |
| L2 | R3 = | 84.587 | | | |
| | | | 5.55 | 1.805 | 25.5 |
| | R4 = | −91.122 | | | |
| L3 | | | 2.00 | 1.743 | 49.2 |
| | R5 = | 37.845 | | | |
| | | | 0.50 | | |
| | R6 = | 25.895 | | | |
| L4 | | | 9.35 | 1.589 | 61.3 |
| | R7 = | −103.236 | | | | where L1-L4 represent the lens elements from the object end to the image side; R1-R7 are the radii of the lens surfaces in millimeters; $N_d$ is the index of refraction of each lens element; and $V_d$ is the dispersion of each lens element in terms of its Abbe number.

8. An afocal reversed telescopic lens adapted to be used with a retrofocus prime lens to provide an increased field angle of the combined lenses upon axial alignment with the prime lens at the object end thereof, said lens comprising from the object end: a first negative group consisting of a meniscus element convex to the object, a second negative group in the form of a doublet including a positive element convex to the object, and a third positive group having convex object and image side surfaces, wherein $$3.0 < |K_3/K_2| < 4.0$$

where $K_3$ is the power of the third group and $K_2$ is the power of the second group.

9. An afocal reversed telescopic lens adapted to be used with a retrofocus prime lens to provide an increased field angle of the combined lenses upon axial alignment with the prime lens at the object end thereof, said lens from the object end thereof, consisting of a negative meniscus element convex to the object, a negative doublet including a positive element convex to the object, and a bi-concave element.

* * * * *